United States Patent [19]
Ono

[11] Patent Number: 5,606,697
[45] Date of Patent: Feb. 25, 1997

[54] COMPILER SYSTEM FOR LANGUAGE PROCESSING PROGRAM

[75] Inventor: Hirohiko Ono, Tokyo, Japan

[73] Assignee: NEC Corporation, Tokyo, Japan

[21] Appl. No.: 312,904

[22] Filed: Sep. 30, 1994

[30] Foreign Application Priority Data

Sep. 30, 1993 [JP] Japan ................................. 5-243428

[51] Int. Cl.⁶ ................................................. G06F 9/45
[52] U.S. Cl. ........................................ 395/707; 395/709
[58] Field of Search ............................................ 395/700

[56] References Cited

U.S. PATENT DOCUMENTS

| | | | |
|---|---|---|---|
| 4,773,007 | 9/1988 | Kanada et al. | 395/700 |
| 5,339,419 | 8/1994 | Chan | 395/700 |
| 5,375,242 | 12/1994 | Kumar | 395/700 |
| 5,396,631 | 3/1995 | Hayashi et al. | 395/700 |
| 5,448,737 | 9/1995 | Burke et al. | 395/700 |
| 5,450,585 | 9/1995 | Johnson | 395/700 |
| 5,452,461 | 9/1995 | Umekita et al. | 395/700 |
| 5,475,842 | 12/1995 | Gilbert et al. | 395/700 |
| 5,481,708 | 1/1996 | Kukol | 395/700 |
| 5,493,675 | 2/1996 | Faiman et al. | 395/700 |
| 5,515,535 | 5/1996 | Frankel et al. | 395/700 |
| 5,535,391 | 7/1996 | Hejlsberg et al. | 395/700 |
| 5,548,758 | 8/1996 | Pirahesh et al. | 395/700 |
| 5,548,761 | 8/1996 | Balasundaram et al. | 395/700 |

FOREIGN PATENT DOCUMENTS

| | | |
|---|---|---|
| 59-020051 | 1/1984 | Japan . |
| 59-20051 | 2/1984 | Japan . |
| WO92/22029 | 12/1992 | WIPO . |

OTHER PUBLICATIONS

Falk, H., "Optimizing compilers address debugging and user control constraints", *Computer Design*, vol. 27, No. 13, Jul. 1988, pp.48–55.

Aho et al., "Compliers: Principles, Techniques, and Tools", Addison–Wesley Publishing Company, (1986), pp. 1–2.

*Primary Examiner*—Kevin A. Kriess
*Assistant Examiner*—John Q. Chavis
*Attorney, Agent, or Firm*—Foley & Lardner

[57] ABSTRACT

A compiler includes an optimizing function combination table, so that a plurality of optimization processing are carried out in accordance with different combinations of optimizing functions in the combination table. Thus, a corresponding number of output files are outputted together with output file information.

3 Claims, 5 Drawing Sheets

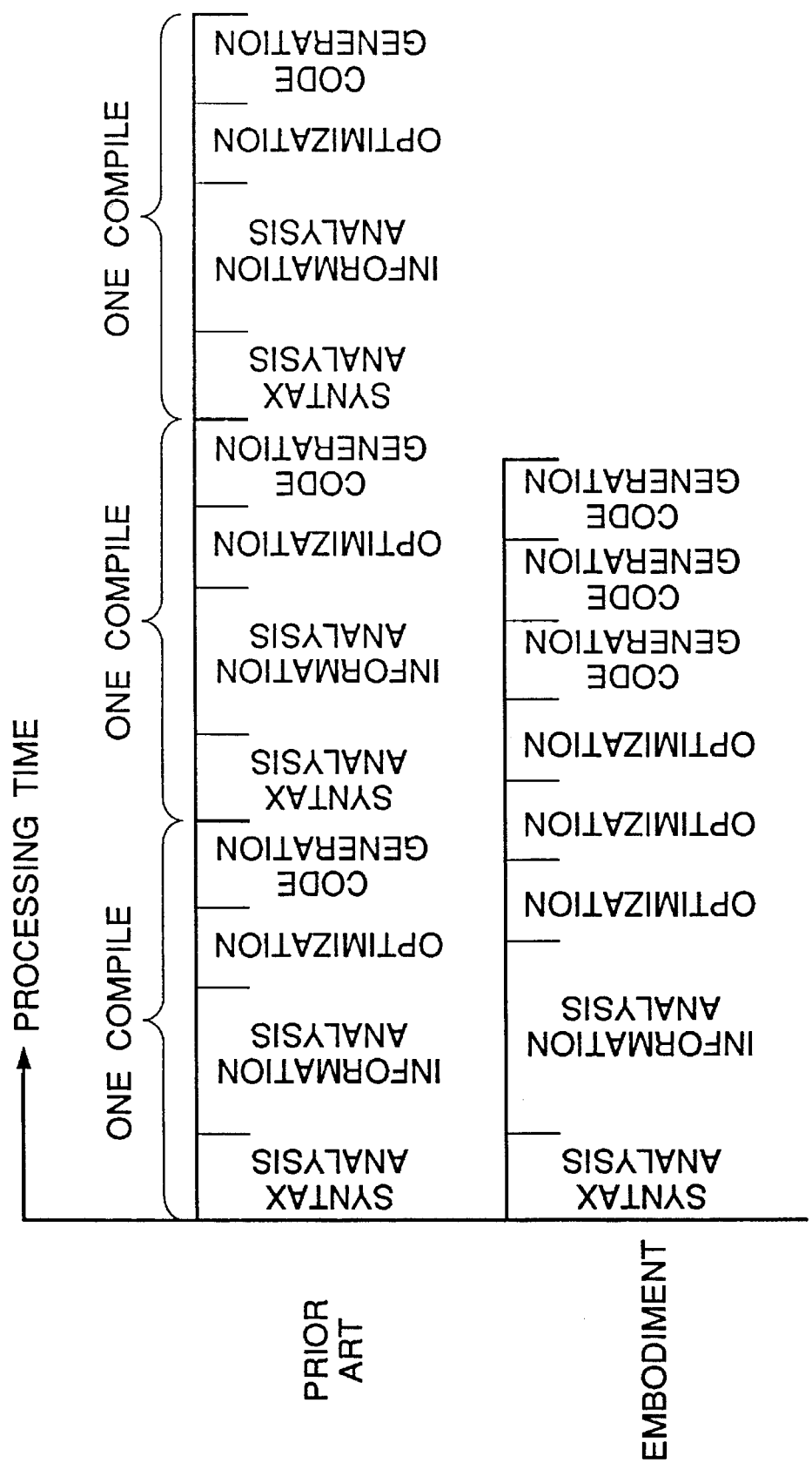

COMPILER SYSTEM FOR LANGUAGE PROCESSING PROGRAM

BACKGROUND OF THE INVENTION

1. Field of the Invention

The present invention relates to a compiler system for a language processing program.

2. Description of Related Art

Conventionally, a computer program is developed in such a manner that a source program is created by a program developer, and the created source program is processed by a language processing program (for example, compiler) so that it it translated into a sequence of machine language instructions for a microcomputer, and the sequence of machine language instructions is installed in a memory within the microcomputer and then, executed by the microcomputer. A source program written in a high level language is translated by a compiler to be converted into an object machine language sequence.

Referring to FIG. 1, there is shown a block diagram illustrating a conventional compiler system.

In a compiler 102A, a source program 101 is analyzed by a syntax analysis part 103 so that a pre-optimization intermediate code information 104 is prepared. Thereafter, in an optimization part 105A, the intermediate code information is analyzed for optimization, so that optimization analyzed information 107 is created. With reference to the optimization analyzed information 107, the intermediate code is optimized so as to create a post-optimization intermediate code information 108. In a code generator 109A, the optimized intermediate code information 108 is converted into a sequence of machine language instructions, thereby to prepare an output file 111A.

Here, the "optimization" is to modify, eliminate and improve the intermediate code information, for the purpose of reducing the machine language instructions outputted in the code generator 109A and to elevate a performance of executing the obtained instructions. In the modification and elimination in the process of the optimization, an improved intermediate code information is required to have the same function as that of an input intermediate code information. The optimization is realized in various methods, and one example of the optimization is described in detail in Chapter 10 of Alfred V. AHO et al., "Compilers: Principles, Techniques, and Tool", Addison-Wesley Publishing Company (U.S.A), 1986, the disclosure of which is incorporated by reference in its entirety into the present application.

For example, in the optimization for common subexpressions, the result of an equivalent operation expression is held so as to avoid re-calculation, so that the size and the execution performance of the obtained sequence of machine language instructions are improved. The other optimization includes a loop optimization, a register assignment, a branch optimization, and others.

From a different viewpoint, the optimizing function can be divided into an optimization for shortening the sequence of instructions and an optimization of execution performance. The optimization for elevating the execution performance may accompany increase in the size of the obtained sequence of machine language instructions. In addition, an optimizing function can be designated by designating an option at the time of starting the compiler. For example, it is possible to start only elimination of common subexpressions selected from a plurality of optimizing functions. On the other hand, when a plurality of optimizing functions are executed in combination, it is in some cases that the size of the obtained sequence of machine language instructions is increased.

Returning to FIG. 1, the optimization part 105A of the compiler 102A produces information which is obtained by analyzing the intermediate code information 104 generated in the syntax analysis part 103 and which is necessary for performing a necessary optimization from the intermediate code information 104. In the case of the register assignment optimization, the analyzed information is the extent in which variables called "data flow information" are referenced and set. In the case of the branch optimization, the analyzed information is a position of a branch information in the intermediate code information and a position of a label in the intermediate code information. Ordinarily, this information analysis entails a long processing time.

In a compiler for a microcomputer, it is necessary to install a sequence of machine language instructions complied from the source program, into a limited ROM region provided in the microcomputer. In addition, when the installed sequence of machine language instructions are executed, it is necessary to have a sufficient execution performance. A use of a compiler is required to compile and develop the program, while designating various kinds of optimization functions in the compiler and investigating the size of the obtained machine language instruction sequence and the execution performance. The loop optimization and the inline optimization of a function, which are performed for elevating the execution performance, often increase the program size.

In some cases, the compiler outputs a machine language instruction for substituting an existing instruction for an operation instruction that is not provided in the microcomputer and/or an operation of a data length that is larger than that of the microcomputer. In other cases, the compiler performs a library call for a run time library.

One kind of optimization by compiler includes an optimization minimizing the output size of the program by calling the run time library. The code output optimization utilizing the run time library can minimize the output program size, but since the library calling is performed, the execution performance drops. A program developer is required to carry out the compile and to confirm the result, any number of times, so as to optimize the designation of the compiler, for the purpose of finally obtaining a program that has the size smaller than that of the ROM region into which the program is stored, and that has an execution performance higher than that expected by the program developer. Therefore, a greatly long time is needed. In addition, the larger the input file is, the longer the processing time accompanied by the optimization becomes. Therefore, the development time becomes further long, if the confirmation is performed many times.

Japanese Patent Application Laid-open Publication JP-A-59-20051 discloses a program execution system, in which information for optimizing the intermediate codes obtained after the syntax analysis is retained, and when the program is executed, an optimum execution code is generated on the base of the intermediate codes and the optimization information. However, this is not yet satisfactory.

SUMMARY OF THE INVENTION

Accordingly, it is an object of the present invention to provide a compiler system which has overcome the above mentioned defect of the conventional one.

Another object of the present invention is to provide a compiler method for a language processing program, capable of greatly shortening the optimization processing time.

The above and other objects of the present invention are achieved in accordance with the present invention by a compiler system for a language processing program, comprising means for analyzing an input source program and converting the input source program into a first intermediate information, means having a plurality of optimizing functions, for optimizing the first intermediate information into a second intermediate information, information holding means for holding a plurality of combinations of optimizing functions to the optimizing means, a code generator means for converting the second intermediate information obtained by the optimizing function combination, into a machine language instruction, file information output means for outputting an output file information when the second intermediate information obtained by the optimizing function combination was converted into a machine language instruction, and means for outputting a plurality of output files based on the optimizing functions combinations.

The above and other objects, features and advantages of the present invention will be apparent from the following description of preferred embodiments of the invention with reference to the accompanying drawings.

BRIEF DESCRIPTION OF THE DRAWINGS

FIG. 4 is a time chart illustrating an advantage of the compiler system in accordance with the present invention.

DESCRIPTION OF THE PREFERRED EMBODIMENTS

Figure 1:
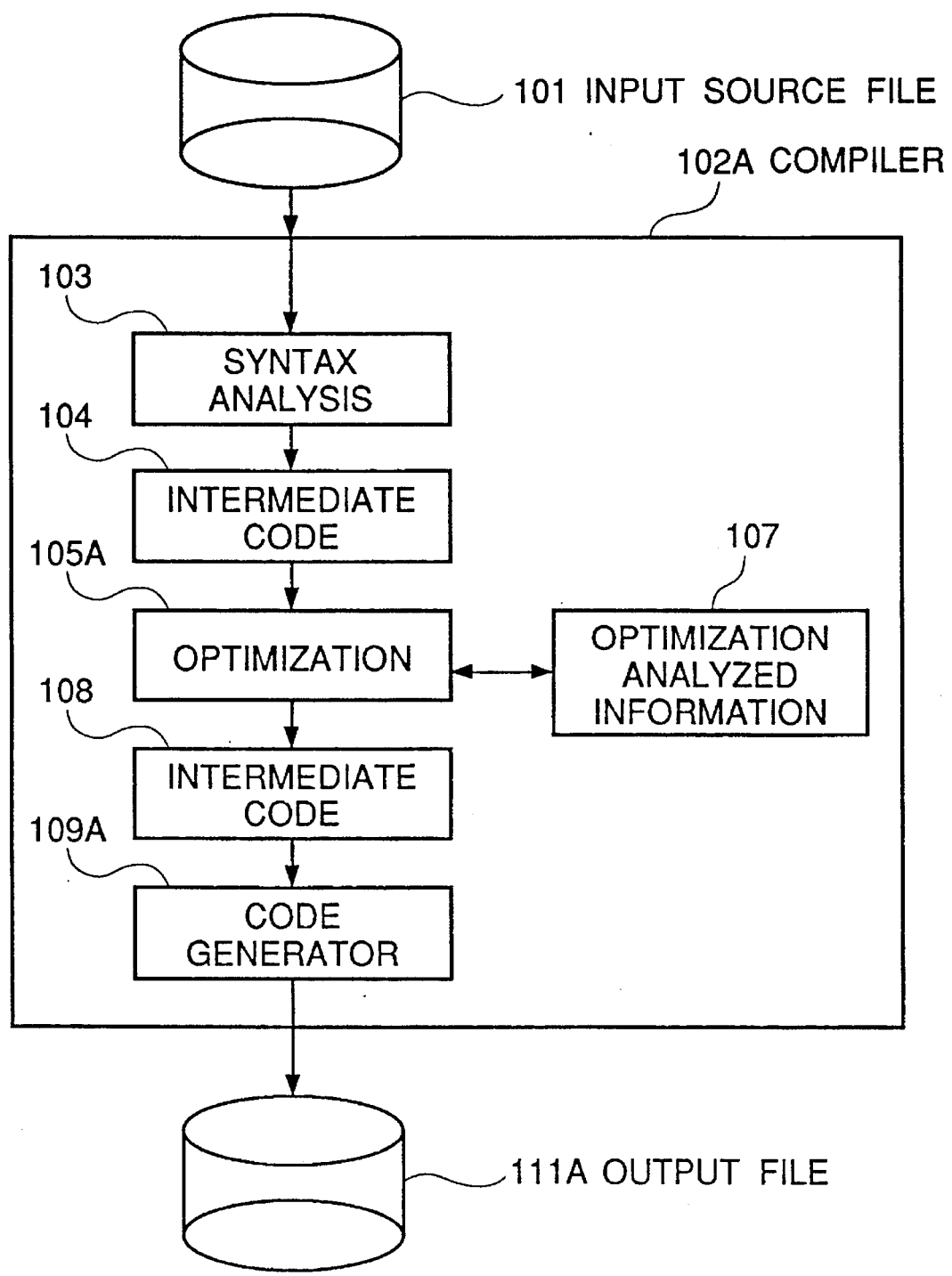
FIG. 1 is a block diagram illustrating a conventional compiler system.
Figure 2:
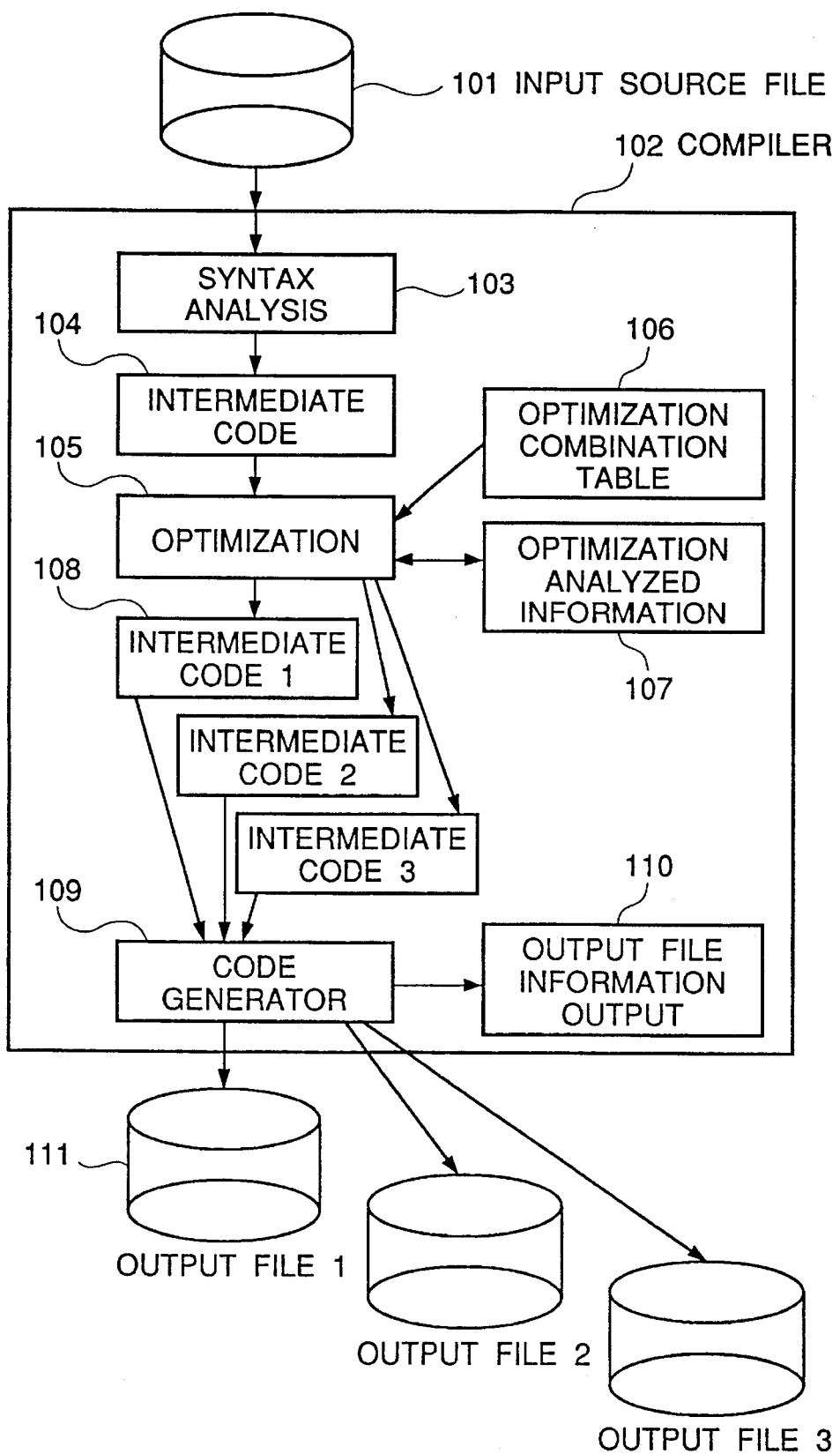
FIG. 2 is a block diagram of one embodiment of the compiler system in accordance with the present invention.

Referring to FIG. 2, there is shown a block diagram of one embodiment of the compiler system in accordance with the present invention.

A source program 101 is supplied to a compiler 102A, in which the source program 101 is analyzed by a syntax analysis part 103 so that a pre-optimization intermediate code 104 is generated by the syntax analysis part 103. The pre-optimization intermediate code 104 is supplied to an optimization part 105, where the pre-optimization intermediate code 104 is analyzed so as to generate an optimization analyzed information 107. In addition, an optimized (namely, post-optimization) intermediate code 108 is generated in accordance with an optimization combination table 106. Since the optimization combination table 106 holds a plurality of different combinations of optimization functions, it is in some cases that a plurality of optimized intermediate codes 108 are generated.

A code generator 109 receives the optimized intermediate code or codes 108 and converts each of the received optimized intermediate code or codes 108 into a sequence of machine language instructions, which is outputted as an output file 111. In addition, the code generator 109 also generates a code size information of the output file and the information of the optimization combination used for obtaining the output file.

As mentioned above, the optimization includes various optimization functions. A plurality of different combinations of various optimization functions are previously set in the optimization combination table 106. More specifically, the optimization combination table 106 holds different combinations of a first optimization function group for reducing the size (for example, the elimination of the common subexpression, the branch optimization, the register assignment, etc.) and a second optimization function group for elevating the execution performance (for example, the loop optimization, the function inlining, etc.)

In the following description, it is assumed that three different combinations of various optimization functions are designated or set in the table: a first combination designates the optimization for reducing the size; a second combination designates the optimization for elevating the execution performance; and a third combination designates all of the optimization for reducing the size and the optimization for elevating the execution performance.

Figure 3A:
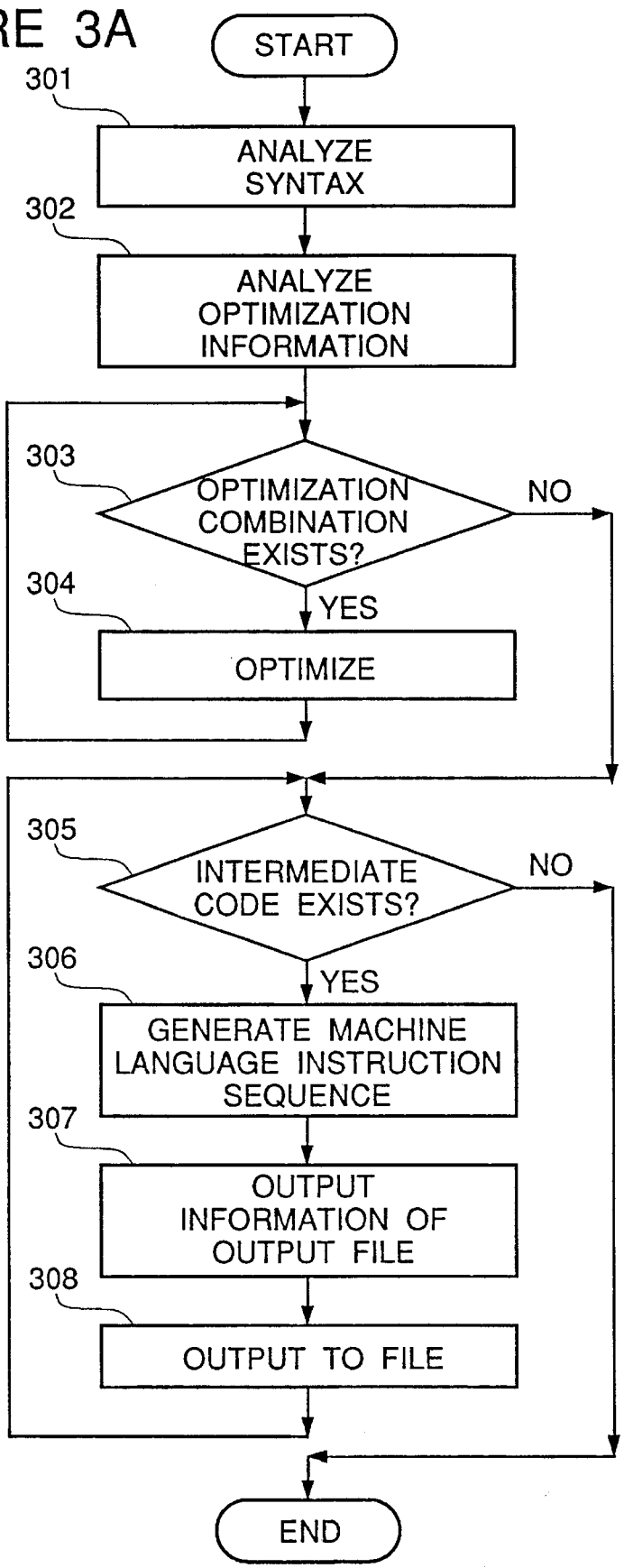
FIGS. 3A and 3B are flowcharts illustrating two examples of the compile operation in the compiler system in accordance with the present invention.

Now, operation of the compile processing will be described with reference to the flow chart of FIG. 3A.

First, at a step 301, the input source file is read in the compiler, and the syntax analysis is performed in the syntax analysis part 103 to generate the pre-optimization intermediate code 104.

At a step 302, the pre-optimization intermediate code 104 is applied to the optimization part 105, so that the analyzed information 107 for optimization is generated. With reference to this optimization analyzed information 107, each optimization is performed.

At a next step 303, whether or not there is a combination(s) of optimization functions in the optimization combination table 106, is discriminated. If there is an optimization combination, the optimization is performed in accordance with the optimization combination in a step 304. If there is no optimization combination, the code generation is performed.

In this example, since the three difference combinations of various optimization functions are set in the table 106, the optimization is performed in the step 304 in accordance with the optimization combination designated in the table 106. First, in the step 304, the optimization is performed in accordance with for example the first optimization combination only for reducing the size, so that an optimized (or second) intermediate code 108 such as "INTERMEDIATE CODE 1" in FIG. 2 is generated. Thereafter, the operation returns to the step 303, and the table 106 is investigated to discriminate whether or not there is another combination of optimization functions in the optimization combination table 106. Therefore, the optimization is performed in accordance with the second optimization combination only for elevating the execution performance, so that another optimized intermediate code 108 such as "INTERMEDIATE CODE 2" in FIG. 2 is generated. Thereafter, the operation returns to the step 303, again, and the table 106 is investigated to discriminate whether or not there is a third combination of optimization functions in the optimization combination table 106. Therefore, the optimization is performed in accordance wit the third optimization combination including all of the optimization for reducing the size and the optimization for elevating the execution performance, so that a third optimized intermediate code 108 such as "INTERMEDIATE CODE 3" in FIG. 2 is generated. Thereafter, the operation returns to the step 303, again, and the table 106 is investigated to discriminate whether or not there is a further combination of optimization functions in the optimization combination table 106. Since no further combination of optimization functions exists in the table 106, the operation goes to a step 305. As a result, a plurality of optimized intermediate codes are generated in accordance with a plurality of different optimization combinations.

Thereafter, a code generation is carried out in the code generator 109. For this purpose, in the step 305, whether or not there is the optimized intermediate code, is investigated. If there is no optimized intermediate code, the processing ends.

If there is an optimized intermediate code, the optimized intermediate code is converted into a sequence of machine language instructions in a step 306. Then, in a step 307, information of the code size of the converted sequence of machine language instructions and information of the optimization combination used, are outputted in the form of a message to the program developer. Thereafter, in a step 308, the converted sequence of machine language instructions is outputted as an output file 111.

In this example, in the step 307, the first optimization combination only for reducing the size and the code size of the converted sequence of machine language instructions obtained in accordance with the first optimization combination, are outputted. Then, in the step 308, the converted sequence of machine language instructions is outputted as an "OUTPUT FILE 1". Thereafter, the processing returns to the step 305, and then, the second optimization combination only for elevating the execution performance and the code size of the converted sequence of machine language instructions obtained in accordance with the second optimization combination, are outputted. Then, in the step 308, the converted sequence of machine language instructions is outputted as an "OUTPUT FILE 2". Thereafter, the processing returns to the step 305, again, and then, the third optimization combination both for reducing the size and for elevating the execution performance and the code size of the converted sequence of machine language instructions obtained in accordance with the third optimization combination, are outputted. Then, in the step 308, the converted sequence of machine language instructions is outputted as an "OUTPUT FILE 3".

Thus, the program developer can select the output file suitable to the development, from the code size information of the compile result and the used optimization combination information.

As mentioned above, there are a plurality of intermediate codes obtained in accordance with a plurality of optimization combinations. In general, the optimization needs a long processing time as mentioned hereinbefore. The reason for this is that a large processing time is needed for analyzing the intermediate code information for the optimization. In this embodiment, a plurality of optimizations are performed, but since the plurality of optimization are performed by repeatedly utilizing the once-analyzed optimization information, the time for the optimizations can be greatly shorted.

Figure 3B:
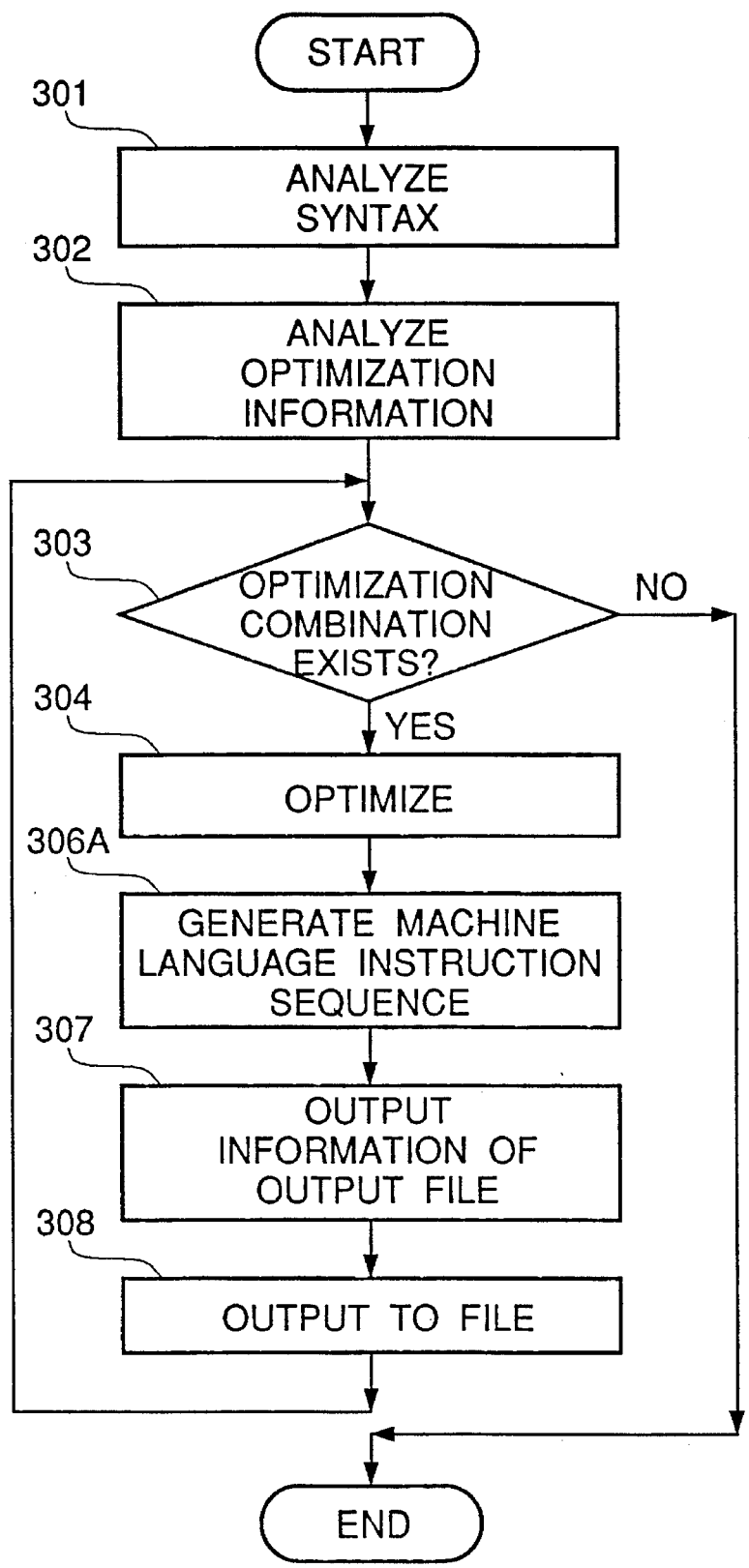

Referring to FIG. 3B, there is shown the flow chart illustrating the second embodiment of the compile processing in accordance with the present invention. The second embodiment is different from the first embodiment in the compile outputting method. In this second embodiment, the optimization combination table 106 stores a plurality of different optimization combinations for the compiler, similarly to the first embodiment.

The following is operation of the second embodiment.

First, at a step 301, similarly to the first embodiment, the input source file is read in the compiler, and the syntax analysis is performed in the syntax analysis part 103 to generate the pre-optimization intermediate code 104.

At a step 302, the pre-optimization intermediate code 104 is applied to the optimization part 105, so that the analyzed information 107 for optimization is generated. Each optimization is performed with reference to this optimization analyzed information 107.

At a next step 303, whether or not there is an optimization combination(s) in the optimization combination table 106, is discriminated. If there is an optimization combination, the optimized intermediate code 108 is generated in accordance with the optimization combination stored in the table 106, in a step 304. If there is no optimization combination, the operation ends.

Thereafter, in a step 306A, the optimized intermediate code is converted into a sequence of machine language instructions. Then, in a step 307, information of the code size of the converted sequence of machine language instructions and information of the optimization combination used, are outputted in the form of a message to the program developer. Thereafter, in a step 308, the converted sequence of machine language instructions is outputted as an output file 111. Thereafter, the processing returns to the step 303, and the steps 303 to 308 are repeated.

As a result, similarly to the first embodiment, the first optimization combination only for reducing the size and the code size of the converted sequence of machine language instructions obtained in accordance with the first optimization combination, are outputted as the output file information, and the converted sequence of machine language instructions is outputted as an "OUTPUT FILE 1". Then, the second optimization combination only for elevating the execution performance and the code size of the converted sequence of machine language instructions obtained in accordance with the second optimization combination, are outputted as the output file information, and the converted sequence of machine language instructions is outputted as an "OUTPUT FILE 2". Furthermore, the third optimization combination for reducing the size and for elevating the execution performance and the code size of the converted sequence of machine language instructions obtained in accordance with the third optimization combination, are outputted as the output file information, and the converted sequence of machine language instructions is outputted as an "OUTPUT FILE 3".

Accordingly, similarly to the first embodiment, the program developer can select the output file suitable to the development, from the code size information of the compile result and the sued optimization combination information.

As mentioned above, in general, the optimization needs a long processing time because a large processing time is needed for analyzing the intermediate code information for the optimization. In the second embodiment, similarly to the second embodiment, a plurality of optimizations are performed, but since the plurality of optimizations are performed by repeatedly utilizing the once-analyzed optimization information, the time for the optimizations can be greatly shortened.

In addition, in the second embodiment, the code generation is performed directly from the intermediate code generated in accordance with the designated optimization combination. Therefore, the processing speed becomes higher than that of the first embodiment.

Referring to FIG. 4, there is shown a time chart illustrating an advantage of the compiler system in accordance with the present invention. The "PRIOR ART" shown in FIG. 4 illustrates the processing time required in the case in which three compiles are sequentially performed, one after another, in accordance with three different optimization combinations. The "INVENTION" shown in FIG. 4 illustrates the processing time required in the first embodiment. It would be readily understood from FIG. 4 that, in the present invention, since a plurality of optimizations are performed by repeatedly utilizing the once analyzed optimization information, if is sufficient if only one syntax analysis and only one optimization information analysis are performed, and therefore, the time for the optimizations can be greatly shortened.

The invention has thus been shown and described with reference to the specific embodiments. However, it should be noted that the present invention is in no way limited to the details of the illustrated structures but changes and modifications may be made within the scope of the appended claims.

I claim:

1. A compiler system for a language processing program, comprising means for analyzing an input source program and converting the input source program into a first intermediate information, means having a plurality of optimizing functions, for optimizing the first intermediate information into a second intermediate information, information holding means for holding a plurality of optimizing function combinations to the optimizing means, a code generator means for converting the second intermediate information obtained by the optimizing function combination, into a machine language instruction, file information output means for outputting an output file information when the second intermediate information obtained by the optimizing function combination was converted into a machine language instruction, and means for outputting a plurality of output files based on the optimizing function combinations.

2. A compiler system claimed in claim 1 wherein said optimizing means is configured to generate a code during a period in which there exists the intermediate code optimized in accordance with the optimization combination.

3. A compiler system claimed in claim 1 wherein said optimizing means is configured to generate a code directly from the intermediate code optimized in accordance with the optimization combination.

\* \* \* \* \*